US005575235A

United States Patent [19]

Nakagawa et al.

[11] Patent Number: 5,575,235

[45] Date of Patent: Nov. 19, 1996

[54] ELECTRONIC ILLUMINATION APPARATUS

[75] Inventors: Yoshinobu Nakagawa; Tomitaro Murakami; Hiroshi Matsui, all of Osaka, Japan

[73] Assignee: Matsushita Electric Industrial Co., Ltd., Osaka, Japan

[21] Appl. No.: 125,657

[22] Filed: Sep. 23, 1993

[30] Foreign Application Priority Data

Sep. 30, 1992 [JP] Japan .................................... 4-261186

[51] Int. Cl.[6] .............................. G01O 11/28; H01C 1/02

[52] U.S. Cl. .......................... 116/286; 116/310; 338/166; 338/184

[58] Field of Search .................................... 116/246, 247, 116/261, 263, 284, 286, 289, 305–307, 309, 310, DIG. 5; 338/118, 119, 134, 143, 147, 160, 162, 163, 166, 184, 196, 199, 168; 362/32, 295

[56] References Cited

U.S. PATENT DOCUMENTS

| | | | |
|---|---|---|---|
| 3,819,928 | 6/1974 | Kuroyama et al. | 362/32 |
| 3,848,219 | 11/1974 | Oka | 338/119 |
| 3,920,980 | 11/1975 | Nath | 362/32 |
| 3,920,986 | 7/1976 | Seyler et al. | 338/162 |
| 3,997,864 | 12/1976 | Oka et al. | 338/119 |
| 4,500,167 | 2/1985 | Mori | 362/32 |
| 4,542,366 | 9/1985 | Oyama | 338/119 |
| 4,739,300 | 4/1988 | Kuratani | 338/162 |
| 4,914,417 | 4/1990 | Matsui et al. | 338/162 |

FOREIGN PATENT DOCUMENTS

| | | |
|---|---|---|
| 2425906 | 12/1975 | Germany . |
| 3316437 | 9/1983 | Germany . |
| 2-86404 | 8/1990 | Japan . |
| 2-86402 | 8/1990 | Japan . |
| 2-86403 | 8/1990 | Japan . |
| 2-22446 | 3/1991 | Japan . |
| 2-22445 | 3/1991 | Japan . |
| 4083304 | 7/1992 | Japan . |

*Primary Examiner*—William A. Cuchlinski, Jr.
*Assistant Examiner*—Andrew Hirshfeld
*Attorney, Agent, or Firm*—McDermott, Will & Emery

[57] ABSTRACT

The present invention relates to an electronic illumination apparatus which may be used in audio equipment. The electronic illumination apparatus allows recognition of the position of rotational operation of a knob by the light from a built-in light emitting diode. The object of the present invention is to provide an illumination type electronic part of rotational operation which is readily adaptable to changes in specifications for the rotational operation shaft. The disclosed apparatus also is able to withstand a strong thrust force applied to the rotational operation shaft, to reduce the hitting sound emitted from the rotatable stopper of the rotational operation shaft, and also to light up the illumination means disposed on the end of the rotational operation shaft in a stable manner. In order to achieve the foregoing object, the rotational operation shaft is made in a simple hollowed cylindrical shape, and the rotor having a stopper for restricting the extent of its rotational motion is prepared separately from the rotational operation shaft, preferably by resin molding. More preferably, the rotor is made of a transparent resin and integrally molded together with the light collecting lens for the light emitting apparatus.

14 Claims, 8 Drawing Sheets

ELECTRONIC ILLUMINATION APPARATUS

BACKGROUND OF THE INVENTION

1. Field of the Invention

The present invention is directed to an electronic illumination apparatus. Specifically, the present invention is directed to an improved motor driven electronic illumination apparatus having rotational operation for use in, for example, audio equipment which is capable of indicating the operational position of its knob by means of light from a built-in light source, for example, an LED (Light Emitting Diode).

2. Description of the Prior Art

In the prior art it is known to produce motor-driven electronic illumination apparatus comprising a variable resistor of rotational operation. This illumination apparatus is exemplified by FIGS. 5–8.

As shown in FIG. 5, prior art electronic illumination apparatus have comprised a variable resistor 1, a speed reduction gear mechanism 2, and a motor 3. The variable resistor 1 is composed of a metal bushing 5, a resistance varying means, and an illuminating means 16. The bushing 5 has a housing member 4.

The resistance varying means is composed of a rotational operation shaft 11, which is supported by the bushing 5 and freely rotatable, a driver 12, a brush holder 13, a brush 14, and a resistor substrate 15. The rotational operation shaft 11 is integrally formed of a cylindrical portion 7 which has a through-hole 6 therein, a flange 8 disposed on the rear end of said cylindrical portion 7, a projection 9 disposed at a position on the periphery of said flange 8, and a bow-shaped linkage 10 disposed on the end of said projection 9. The brush holder 13 is linked with the bow-shaped linkage 10 by means of a projection 12A extending from the driver 12. The resistor substrate 15 is held by a substrate holder 19, and a resistor is formed on the surface of said resistor substrate 15. In the prior art, the rotational operation shaft 11, the flange 8, and the bow-shaped linkage 10 have been made of metal, generally from a die-cast mold.

The illuminating means is comprised of a light emitting diode ("LED"), 16 which serves as a light source and is located inside the housing member 4 and at the rear end of the feed-through hole 6 of the rotational operation shaft 11, and a holder 17 for holding the LED 16.

Rotational motion of the rotational operation shaft 11 is restricted because upon rotation the projection 9 of the rotational operation shaft 11 contacts a projection 18 disposed at the lower portion of the concaved portion of the housing 4 of the bushing 5.

The speed reduction gear mechanism 2 comprises a housing box 20. The motor 3 connects to the housing box 20 and has a drive means, a shaft 3A, which projects into the speed reduction gear mechanism 2. The back of the bushing 5, at the substrate holder 19 of the variable resistor 1, contacts the housing box 20 to make an integral body by means of a U shaped bracket 21, to which the motor 3 is fastened by screws.

This structure makes it possible to transmit the rotational motion of the motor 3 to the driver 12 of the variable resistor 1 through the speed reduction gear mechanism 2.

During operation of the motor 3, the rotational motion thereof is reduced in its speed by the speed reduction gear mechanism 2 and transmitted to the driver 12 of the variable resistor 1. The brush holder 13 linked with projection 12A is rotated so that the brush 14 held by the brush holder 13 slides over the resistor substrate 15 thus changing resistance values.

Concurrently, voltage is applied across terminals 22 and the LED 16 is activated to emit light. The emitted light is directed through the through-hole 6 of the rotational operation shaft 11 to illuminate an indicator knob mounted on the end of the rotational operation shaft 11.

The transmission of rotational motion between a last stage reduction gear 23 of the speed-reduction gear mechanism 2 and the projection 12A of the driver 12 is controlled by means of a friction clutch 25 which comprises a sheet spring 24. The friction clutch 25 allows the variable resistor 1 to be manipulated by rotating the rotational operation shaft 11 by hand without turning the motor because the clutch 25 will slip.

While this prior art illumination apparatus provides important advantages by providing rotational operation with variable resistance, it has the disadvantage that the cylindrical portion 7 having the feed-through hole 6, the flange 8 on the rear end of the cylinder, the projection 9 on the periphery of the cylinder, and the bow-shaped linkage 10 on the rear end of the cylinder must be built in an integral fashion to form the rotational operation shaft 11. Complex molding techniques are thus required, such as metal die casting or the like which require complicated molding die, to manufacture the rotational operation shaft 11.

As a result, the electronic illuminating apparatus comprising the aforementioned structure has the disadvantage of requiring that a new mold or die be manufactured when changes in production specifications for the length of the rotational operation shaft 11, the diameter of the knob mounting portion 11A of the rotational operation shaft 11, or the position of the flat portion 11B of the rotational operation shaft 11 are desired.

Another disadvantage of the prior art apparatus is that the flange 8 is integrally molded with the rear end of the rotational operation shaft 11 but has a larger diameter than the fitting receptacle of the bushing 5. Thus, the rotational operation shaft 11 must be inserted from the rearward end of the receptacle of the bushing 5 during assembly. When a strong rearward thrusting force is applied to the rotational operation shaft 11 from the frontward end at the time of mounting a knob onto the rotational operation shaft 11, a danger exists of inflicting damage the internal component parts of the apparatus, for example, the resistor substrate 15.

Another disadvantage of the prior art apparatus is that it has a stopper mechanism to restrict the extent of rotational motion of the rotational operation shaft 11 which is built in such a way that the projection 9 of the rotational operation shaft 11 hits the projection 18 of the concaved housing 4 of the bushing 5 producing an impact which can adversely effect use of the apparatus in audio equipment. This is particularly true when the rotational operation shaft 11 and the bushing 5 are made of metal, causing a sound which may result in annoying effects imposed on certain electrical parts, especially those intended for use in audio equipment.

Another disadvantage of the prior art apparatus is that the long and slender feed-through hole 6 which serves as the light channel for the light emitting source of the LED 16 causes the light intensity at the indicator knob to be adversely diminished, even when an LED of strong directivity is used. Similarly, a problem exists in that scattering of illumination intensity occurs.

Thus, none of the prior art apparatus address the problems of the need to prepare a new die cast mold each time the product specification is changed, the danger of damaging the internal components of the apparatus due to thrust in the rearward direction on the rotational operational shaft, or the inadequacy of the light reaching the indicator knob from the illumination source.

SUMMARY OF THE INVENTION

It is an object of the present invention to provide an electronic illumination apparatus which does not require the manufacture of a new mold or die when production specifications for the length of the rotational operation shaft, the diameter of the knob mounting portion of the rotational operation shaft, or the position of the flat portion of the rotational operation shaft are changed.

It is another object of the present invention to provide an electronic illumination apparatus which will reduce the damage incurred to internal components when a thrust in the rearward direction is applied to the front end of the apparatus.

It is yet another object of the present invention to provide an electronic illumination apparatus which has better illumination characteristics for the indicator knob.

It is yet another object of the present invention to provide an electronic illumination apparatus which reduces or eliminates noises due to the impact of internal components during operation.

According to the present invention, an electronic illumination apparatus is provided comprising: a substrate having thereon a resistor in contact with a brush, the brush positioned on a brush holder, wherein by rotating the brush holder the brush moves over the resistor thereby providing a variable resistance for a current passing through the resistor; a driver connected to the brush holder; a rotor connected to the driver and having thereon a stopper, the rotor further having positioned therein an illumination source; a bushing connected to the rotor, the bushing comprising an end portion and a projection which rotationally contacts the stopper of the rotor; and a rotational operation shaft rotatably connected to the end portion of the bushing so as to freely rotate, and further connected to the rotor so as to rotate with the rotor, the rotational operation shaft having therethrough a feed-through hole through which the light of the illumination source is directed, the rotation of the rotational operation shaft being partially restricted by the stopper contacting the projection, the rotational operation shaft connected to the rotor by inserting the rotational operation shaft from the frontward direction through the end portion of the bushing, wherein rotation of the driver in turn causes the rotation of the rotor and the rotational operation shaft.

Preferably, the rotational operation shaft includes an elevated step portion which allows frontward insertion of the rotational operation shaft into the illumination apparatus without damaging the internal components. Also preferably, the feed-through hole of the rotational operation shaft comprises a channel which tapers toward the front of the rotational operation shaft so that the diameter at the front is lesser than that at the rear.

Also preferably, the illumination source is a light emitting diode ("LED") which is focused through a lens in the rotor. Also preferably, the rotor is Made from a resin. Still more preferably, the lens and the rotor are integrally molded as one unit from a transparent resin.

As described, the present invention has the advantages of easily facilitating changes in specifications for the rotational operation shaft, that damage is avoided to the substrate when the rotational operation shaft is manipulated, that abnormal sound generation due to impact of internal components is avoided, and that damage to the interior of the apparatus due to frontward impact on the rotational operation shaft is reduced. Another advantage is that because the rotor and lens are molded together from a transparent resin, it is possible to make the illuminating means, or knob, disposed on the end of the rotational operation shaft much brighter.

The invention, together with further objects and attendant advantages, will best be understood by reference to the following description, drawings, examples, and tables herein. However, the invention is not limited thereto.

DETAILED DESCRIPTION OF THE INVENTION

Figure 1:
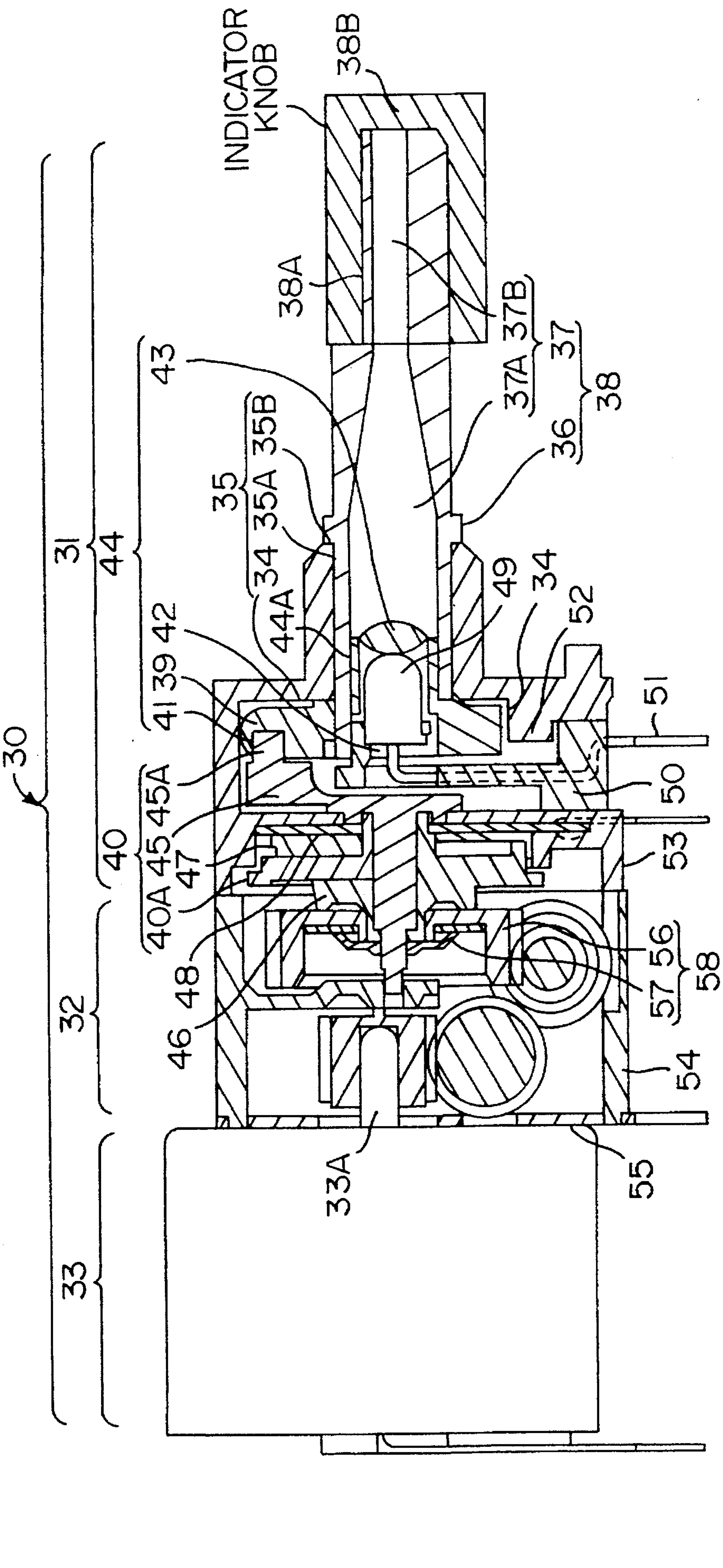
FIG. 1 illustrates a cross-sectional side view of a preferred embodiment of an electronic illumination apparatus according to the present invention.

Turning now to the drawings, FIG. 1 illustrates a cross-sectional side view of a preferred embodiment of an electronic illumination apparatus 30 according to the present invention. As shown in FIG. 1, the motor-driven electronic illumination apparatus 30 is composed of a variable resistor 31 at its frontward end, a speed reduction gear mechanism 32 in its middle portion, and a motor 33 at its rearward end.

The variable resistor 31 is further made up of a bushing 35, a resistance varying means, and an illumination source 49, for example an LED.

The bushing 35 comprises a concaved portion 34 disposed on its rearward end and a front end portion 35B extending frontwardly which includes a circular hole 35A in its central portion.

The resistance varying means comprises a cylindrical rotational operation shaft 38, a rotor 44, a driver 40, a brush 47, and a resistor substrate 48.

As shown in FIG. 1, the rotational operation shaft 38 is comprised of an elevated step portion 36 disposed on its periphery. Upon assembly of the electronic illumination apparatus 30, the rotational operation shaft 38 is frontwardly inserted into the bushing 35 through the end portion 35B until the elevated step portion 36 contacts the frontward end of the end portion 35B of the bushing 35. In this way, the rotational operation shaft 38 is impeded from further insertion into the bushing 35.

The rotational operation shaft 38 further comprises a feed-through hole 37 which is slightly tapered off from a larger diameter hole 37A at the rearward end to a smaller diameter hole 37B at the frontward end, and a flat portion 38A. The rotational operation shaft 38 can be changed in its position freely, and is fitted into and supported by the circular hole 35A of the bushing 35. The frontward end portion 38B of the rotational operation shaft 38 is flattened to have a surface 38A for mounting an indicator knob. Thus, the taper of the feed-through hole 37 wherein the feed-through hole 37 is made smaller in its diameter toward its end to get the smaller diameter hole 37B, fits within the rotational operation shaft 38.

The rotor 44 is comprised of a stopper 39 disposed on its periphery for restricting the extent of rotational motion of the rotor 44, a fitting hole 41 disposed on its rearward end, a recess 42 disposed in its center, and a transparent convex lens 43 for light collection disposed in the frontward end of a rotor shaft 44A at a position which, as assembled, corresponds to a position inside the feed-through hole 37 towards the rearward larger diameter end 37A of the rotational operation shaft 38. The rotor 44 is preferably manufactured as a separate element from the rotational operation shaft 38 and assembled to the rotational operation shaft 38 by connection to the rear end of the rotational operation shaft 38.

The driver 40 is comprised of an arm 45 which has a projection 45A disposed on its frontward end and engaged with the fitting hole 41 of the rotor 44, and a center shaft 40A extending rearwardly.

The brush 47 is positioned on a brush holder 46 and connected or interlinked with the center shaft 40A of the driver 40 so as to rotate together with the center shaft 40A.

The resistor substrate 48 is held by a substrate holder 53 and has a resistor element (not shown) formed on its surface. The brush 47 is slidably contacted with the resistor substrate 48.

The illuminating means is preferably comprised of an LED 49 disposed inside the concave portion 34 of the bushing 35 and directed toward the frontward end of the feed-through hole 37 of the rotational operation shaft 38. An insulating resin-made holder 50 secures the LED 49 to a position behind the transparent convex lens 43. Terminals 51 connect the LED with an outside power source.

A restriction is placed on the extent of rotational motion of the rotational operation shaft 38 due to its connection with the rotor 44, the rotor 44 having stopper 39 which contacts a projection 52 disposed on the lower portion of the concave portion 34 of the bushing 35. A housing box 54 comprises speed reduction gear mechanism 32 and is mounted rearwardly of the substrate holder 53 of the variable resistor 31. The speed reduction gear mechanism 32 is connected to the driver 40 at the center shaft 40A. A motor 33 is mounted behind the speed reduction gear mechanism 32 and connected thereto by motor shaft 33A. The bushing 35, the substrate holder 53, and the housing box 54 complete an integral body which is positioned inside a U-shaped bracket 55 which is fastened to the motor 33 by, for example, screws (not shown).

The speed reduction gear mechanism 32 is formed of a friction clutch 58, the friction clutch 58 comprising a last stage speed reduction gear 56 and a friction spring 57, and contacts the center shaft 40A of the driver 40. The rotational motion of the motor 33 is transmitted to the driver 40 through the friction clutch 58. By virtue of this orientation, in the event that the variable resistor 31 is manipulated by rotating the rotational operation shaft 38 by hand, the friction clutch 58 is forced to slip.

Upon operation of the motor 33, the rotational motion of the motor 33 is transmitted through the motor shaft 33A to the speed reduction gear mechanism 32 which in turn rotates the center Shaft 40A of the driver 40 of the variable resistor 31. In this way, the rotational operation shaft 38 rotates.

When the motor 33 operates, its rotational motion is reduced in speed by the speed reduction gear mechanism 32 and transmitted to the center shaft 40A of the driver 40 in the variable resistor 31. As the driver 40 rotates, the brush 47 on the brush holder 46 rotates across the resistor substrate 48 by virtue of the connection of the brush holder 46 to the center shaft 40A of the driver 40. Concurrently, a varying of resistance values for an electrical circuit (not shown) occurs as a result of the brush 47 slidably moving across the resistor substrate 48.

Contemporaneously with the operation of the motor 33, a voltage, preferably from an external source, is applied across the terminals 51 of the LED 49 to activate the LED 49 and emit light. The emitted light passes through the transparent lens 43 at the front, preferably a convex lens, and is focused in the direction of the frontward end of the rotational operation shaft 38. By virtue of the tapered inner surfaces of the feed-through hole 37, the light is further directed toward the frontward end of the rotational operation shaft 38, and illuminates an indicator knob mounted on the end of the rotational operation shaft 38.

The bushing 35, rotational operation shaft 38, and driver 40 may be made of any suitable material for such purposes. Preferably, the bushing 35, rotational operation shaft 38, and driver 40 are made of a metal or a rigid composite resin comprised of metallic or inorganic material powders and a resin. Suitable metals for this purpose include iron, zinc, aluminum, or a metal alloy. Suitable metallic powders for this purpose include a powder of iron, aluminum, copper or a metallic alloy. Suitable inorganic material powders for this purpose include a powder of glass, silica, alumina, carbon, mica or other art recognized reinforcement materials. Suitable resins for this purpose include polyamide, polyimide, polycarbonate, fluorocarbon polymer, unsaturated polyester resin, epoxy resin, polyether, polyoxymethylene, polysulfone, polyphenylenesulfone or other art recognized engineering plastics used for such purposes.

More preferably, the bushing 35 is made from a die-cast metal formed from a zinc alloy. Also more preferably, the rotational operation shaft 38 is made of a die-cast metal formed of a zinc alloy or an aluminum alloy processed by cutting and scraping. Also more preferably, the driver 40 is made of a die-cast metal formed of a zinc alloy or a glass fiber filled polyamide resin.

Preferably, the rotor 44 is made of a resin material. Suitable resin materials for manufacturing the rotor include a transparent acrylic resin, polycarbonate resin, or other similar known resins suitable for molding or manufacture of such devices. Also preferably, the lens 43 is formed of a resin and molded integrally with the rotor from a transparent molding resin.

Also preferably, the rotational operation shaft 38 is connected to the rotor 44 by caulking. However, any art known method of attachment is suitable such as a snap-fit joint, pressure connections or other similar techniques.

Figure 2:
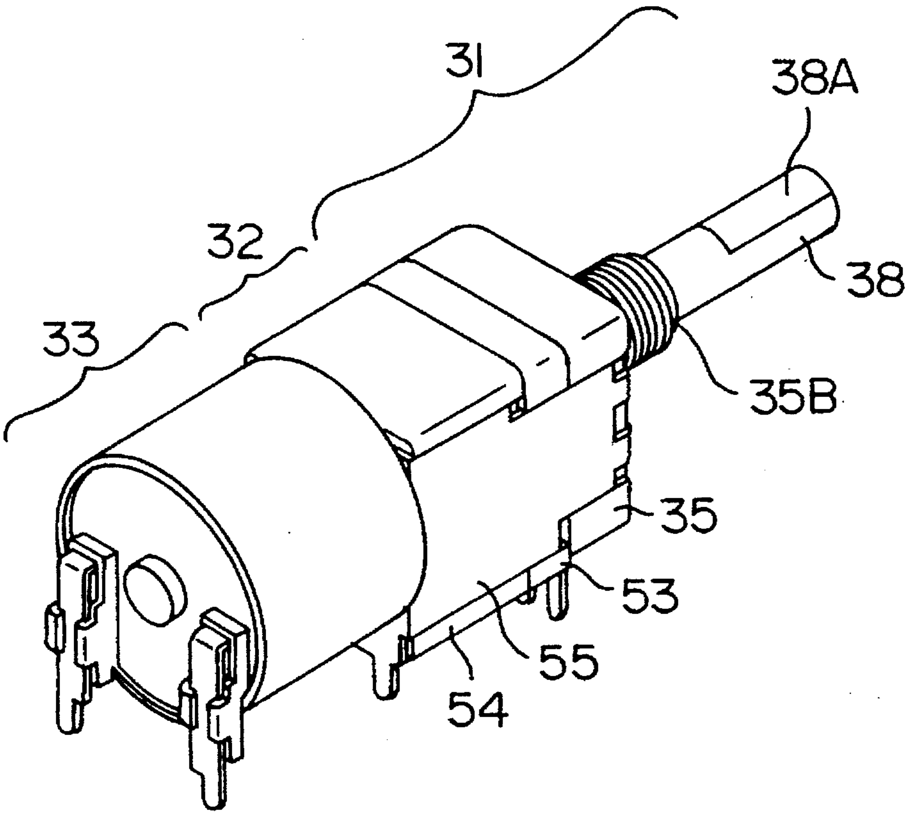
FIG. 2 illustrates a perspective view of a preferred embodiment of an assembled electronic illumination apparatus according to the present invention.

Turning to FIG. 2, a perspective view of a preferred embodiment of an assembled electronic illumination apparatus 30 according to the present invention is illustrated. As shown in FIG. 2, a motor 33 is attached to a speed reduction gear mechanism 32 which is connected to a variable resistor 31. A bushing 35 has attached at a front end portion 35B a rotational operation shaft 38 having a flattened surface 38A. Substrate holder 53 and housing box 54, which are attached together, fit into a U-shaped bracket 55.

Figure 3:
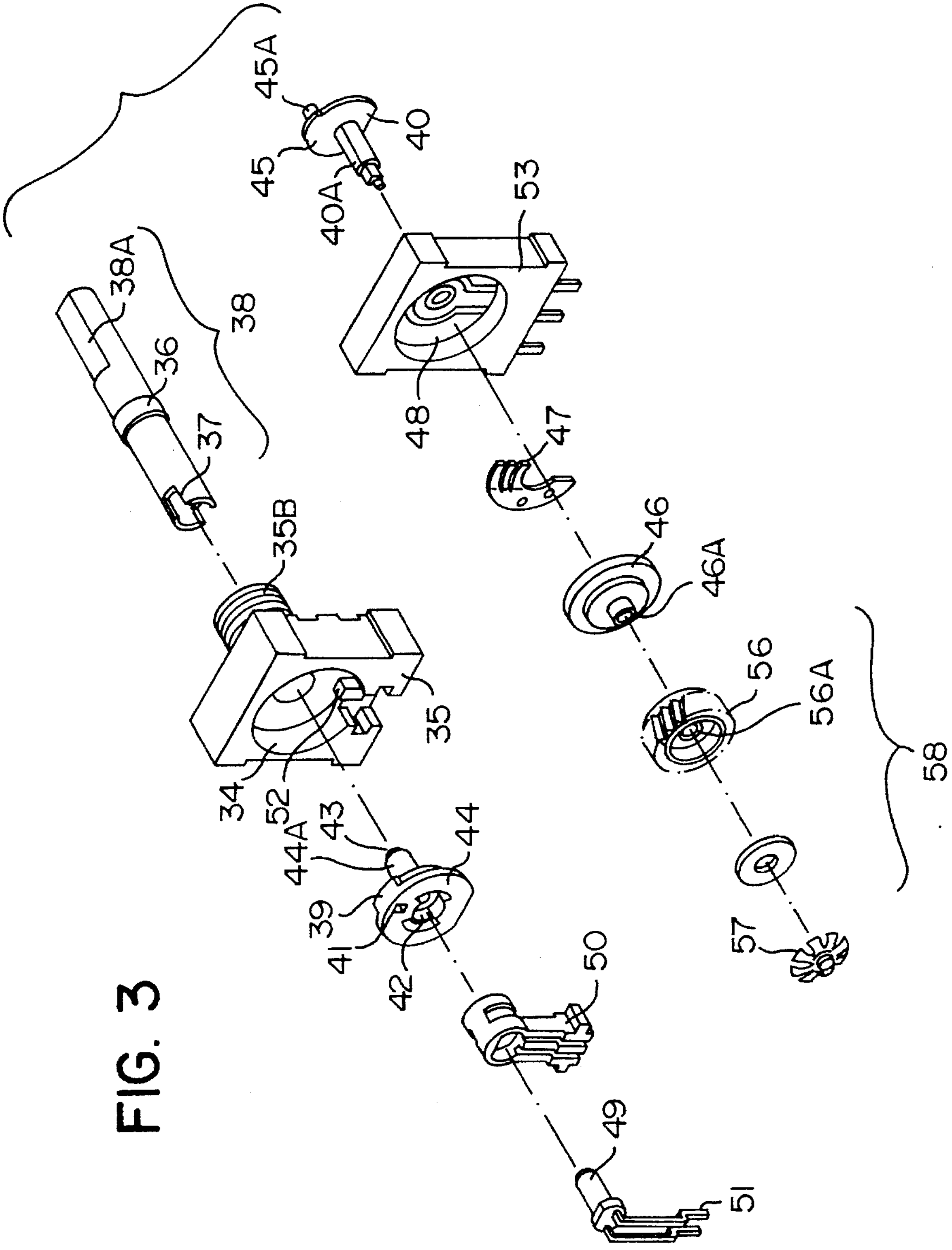
FIG. 3 illustrates an exploded perspective view of a preferred embodiment of a variable resistor of an electronic illumination apparatus according to the present invention.

Turning to FIG. 3, an exploded view of a preferred embodiment of a variable resistor of an electronic illumination apparatus 30 according to the present invention is illustrated. As shown in FIG. 3, a rotational operation shaft 38 has a flattened surface 38A on its forward end, an elevated step portion 36 and a feed-through hole 37.

The rotational operation shaft 38 is designed to be frontwardly inserted into a front end portion 35B of a bushing 35 to a point where the elevated step portion 36 contacts the front end portion 35B of the bushing 35. The bushing 35 further comprises a concave portion 34 and a projection 52. The projection 52 is designed to impede rotational movement of a rotor 44 by contacting a stopper 39 at a predetermined point of the rotation of the rotor 44.

The rotor 44 is comprised of a recess 42, a fitting hole 41, and a lens 43. The lens is positioned on the frontward end of the rotor shaft 44A. A holder 50 supports an illumination source 49, for example, an LED having electrical terminals 51, and is designed to be inserted into the recess 42 of the rotor 44.

A driver 40 includes a center shaft 40A, an arm 45 and a projection 45A. The projection 45A fits into the fitting hole 41 of the rotor so that upon rotation of the driver 40, the rotor 44 similarly rotates.

The center shaft 40A of the driver 40 fits into a hole in a substrate holder 53 having therein a resistor substrate 48. Slidably contacting the resistor substrate 48 is a brush 47 positioned on a brush holder 46. An aperture 46A in the brush holder 46 is adapted to fit the center shaft 40A of the driver 40 so that the driver, upon rotation, causes the brush holder to rotate.

As shown in FIG. 3, a speed reduction gear 56 attaches to the brush holder 46 and the driver 40 via aperture 56A so that when the speed reduction gear 56 rotates it causes the brush holder 46 and the driver 40 to also rotate. A friction spring 57 along with the speed reduction gear 56 make up a friction clutch 58.

Figure 4:
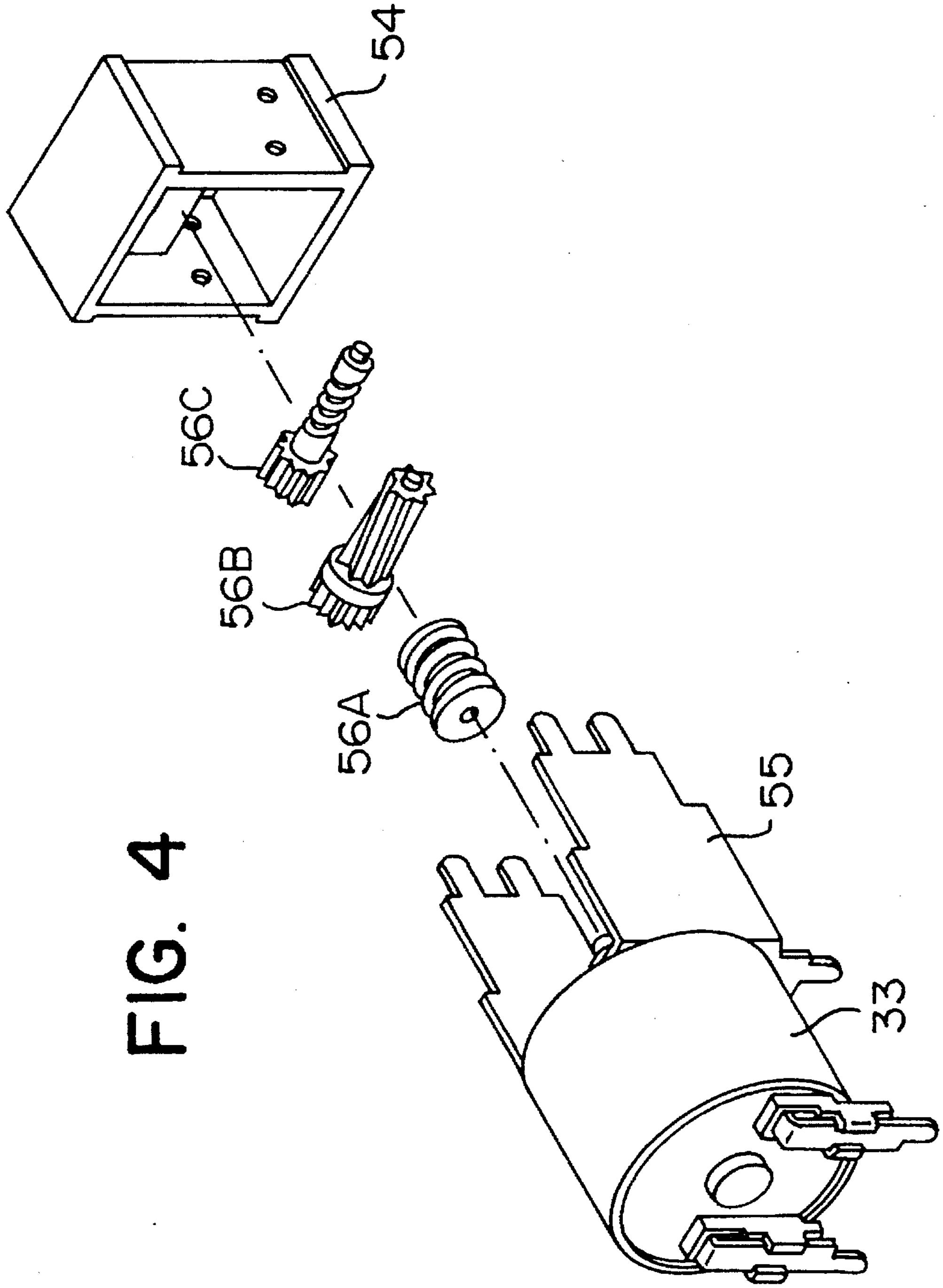
FIG. 4 illustrates an exploded perspective view of a preferred embodiment of a speed reduction gear mechanism of an electronic illumination apparatus according to the present invention.
Figure 5:
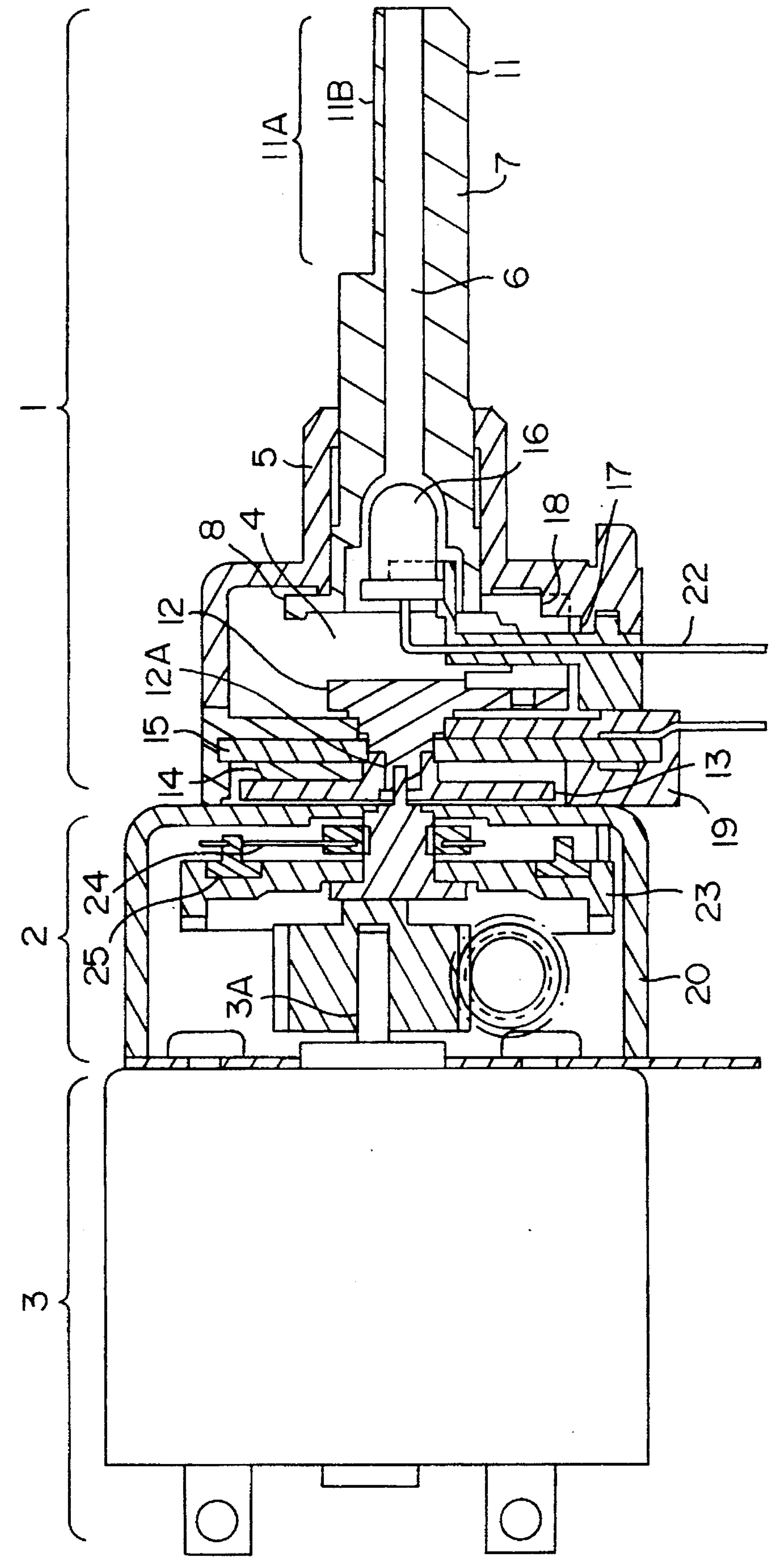
FIG. 5 PRIOR ART
FIG. 5 illustrates a cross-sectional side view of a prior art electronic illumination apparatus.
Figure 6:
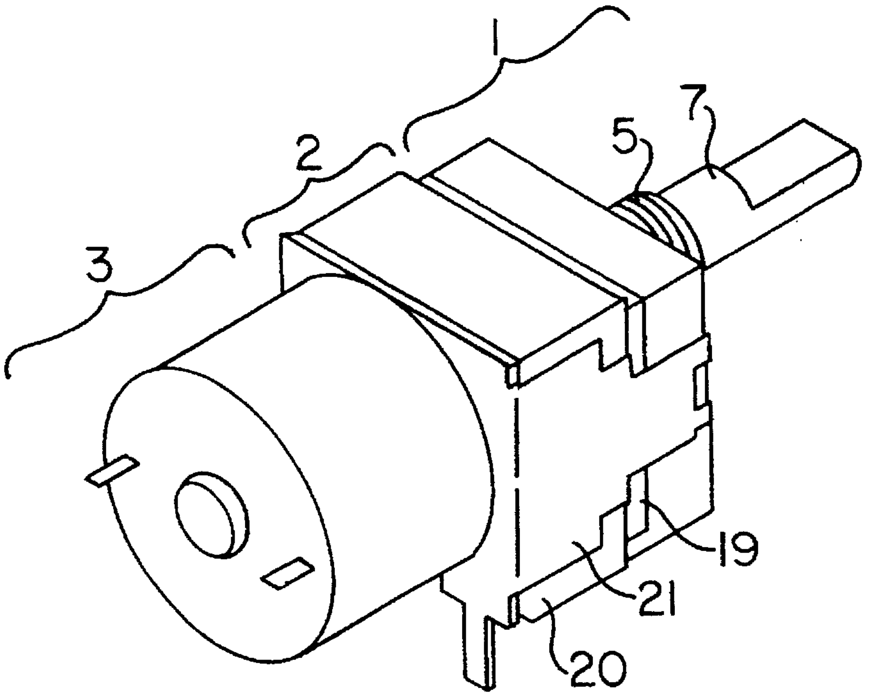
FIG. 6 PRIOR ART
FIG. 6 illustrates a perspective view of a prior art electronic illumination apparatus.
Figure 7:
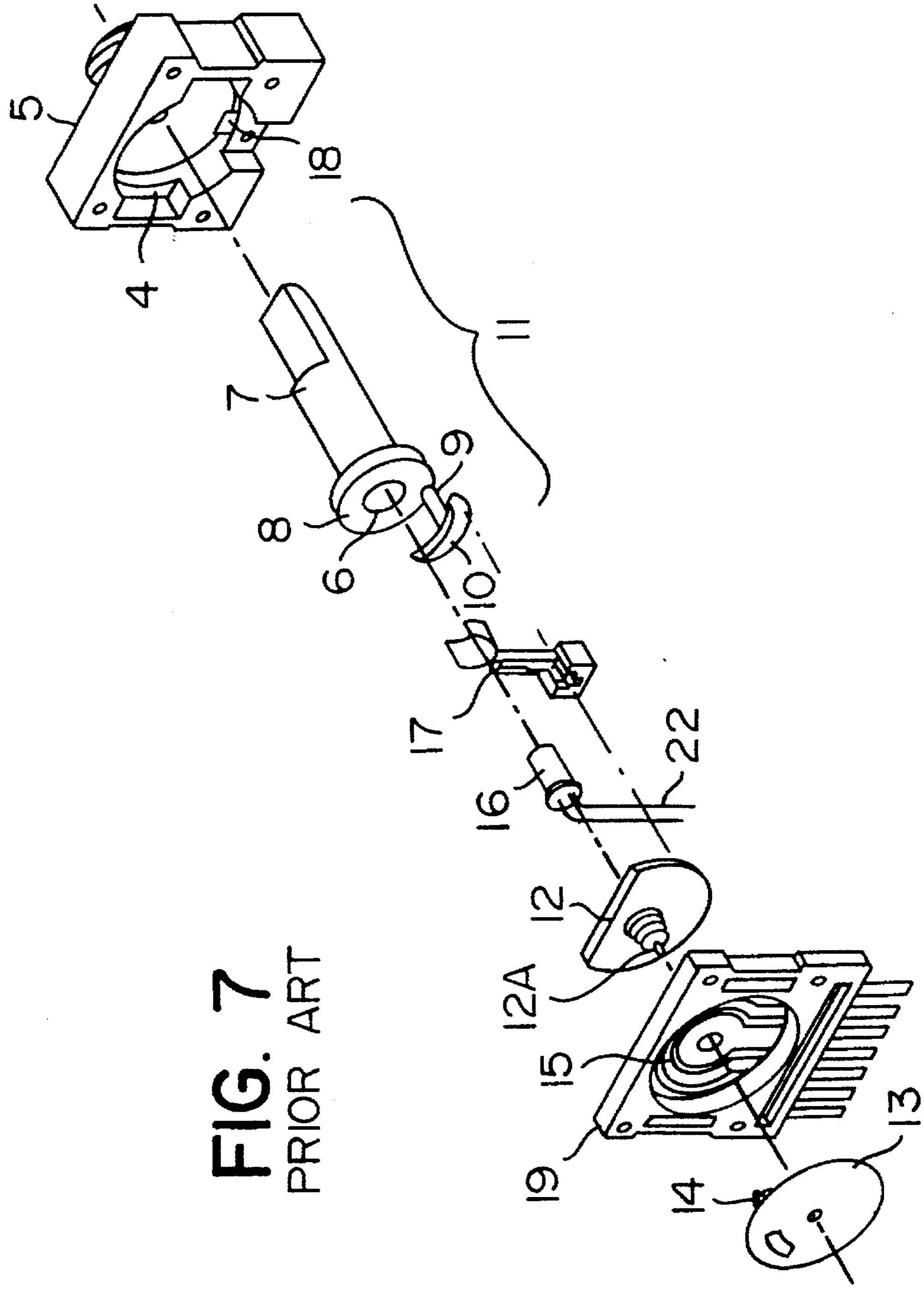
FIG. 7 PRIOR ART
FIG. 7 illustrates an exploded perspective view of a variable resistor of a prior art electronic illumination apparatus.
Figure 8:
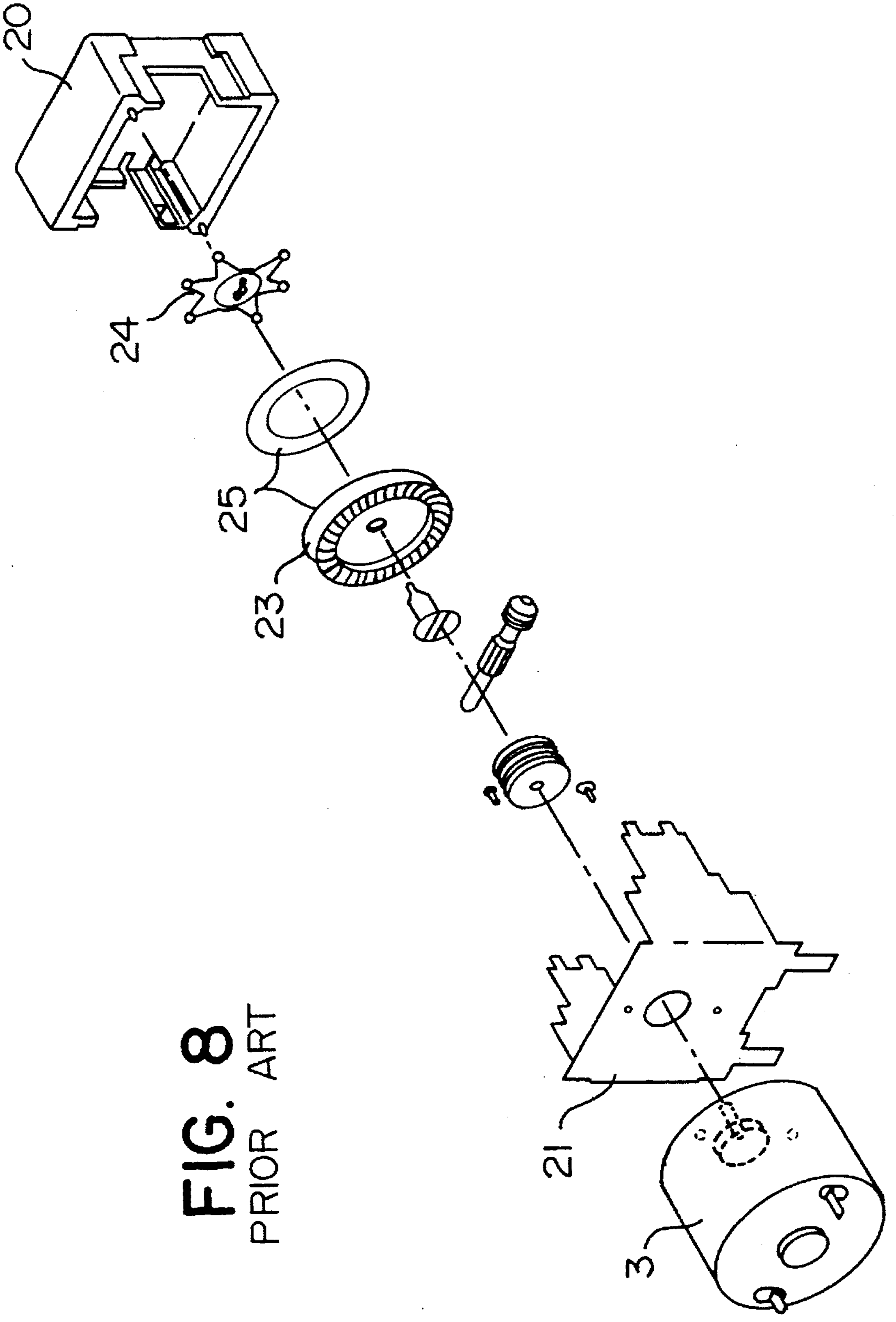
FIG. 8 PRIOR ART
FIG. 8 illustrates an exploded perspective view of a speed reduction gear mechanism of a prior art electronic illumination apparatus.

Turning to FIG. 4, an exploded perspective view of a preferred embodiment of a speed reduction gear mechanism of an electronic illumination apparatus 30 according to the present invention is shown. A housing box 54 is shown which houses speed reduction gears 56A,56B,56C. As shown in FIG. 4, the speed reduction gears 56,56B,56C fit into the housing box 54 which in turn is secured to the U-shaped bracket 55. The U-shaped bracket is secured to the motor 33.

Returning to FIG. 1, many advantages flow from the use of an electronic illuminating apparatus 30 according to the present invention. For example, the simple hollow cylindrical shape of the rotational operation shaft 38 allows modifications to be quickly and inexpensively made in accordance with changes in specifications for the length and diameter of the rotational operation shaft 38. Specifically, rotational operation shaft 38 modifications can be incorporated easily into the herein disclosed electronic illumination apparatus 30 by simple machining by cutting or scraping, thus eliminating the necessity in prior art techniques of using complex dies for die-cast molding or other molding techniques.

Moreover, the use of a rotational operation shaft 38 having an elevated step portion 36 protects the interior components of the electronic illumination apparatus 30 against a thrust in the forward direction on the rotational operation shaft 38.

Additionally, by having the rotational operation shaft 38 inserted from the front end 35B of the bushing 35 through the aperture formed by the front end 35B portion of the bushing, and by incorporating a rotor 44 fixed to the rear side of the bushing 35 in such a way so as to prevent it being dislodged from the rotor 44, the durability of the electronic illuminating apparatus 30 is enhanced. By virtue of this configuration, thrust forces applied to the end of the rotational operation shaft 38 when mounting a knob or during the movement of equipment incorporating the electronic illumination apparatus 30 are absorbed by the elevated step portion 36 and by the front end portion 35A of the bushing 35 instead of by fragile internal components, such as the resistor substrate 48.

Moreover, because the rotor 44 and the projection 52 of the bushing 35 made of resin, any interference caused by the rotation of the rotor 44 forcing the stopper 39 against the projection 52 is reduced or eliminated due to the elimination of metal parts. Accordingly, the presently disclosed electronic illumination apparatus 30 is silent, and becomes of great use in audio equipment or other applications where such interferences are advantageously eliminated.

In addition, the light collecting lens 43 disposed on the end of the rotor shaft 44A permits the light emitted from the LED 49 to be intensified to more brightly illuminate the indicator knob on the end of the rotational operation shaft 38. Similarly, the tapering of the feed-through hole 37 of the rotational operation shaft 38 existing between its larger diameter 37A at the rear end and its smaller diameter 37B at the front end also concentrates the light by reflection along the tapered surface walls inside the feed-through hole 37 to more efficiently brighten the indicator knob, even if the feed-through hole 37 is small in diameter toward the end of the rotational operation shaft 38.

Further, by having the rotor 44 and the light collecting lens 43 formed integrally of a resin, more efficient assembly of the lens 43 and illumination of an indicator knob at the front end of the rotational operation shaft 38 is effected.

Of course, it should be understood that a wide range of changes and modifications can be made to the preferred embodiment described above. It is therefore intended that the foregoing detailed description be understood that it is the following claims, including all equivalents, which are intended to define the scope of this invention.

We claim:

1. In an electronic illumination apparatus comprising:

at least a driver, a resistor substrate, a bushing with a concaved housing, a rotational operation shaft, and an illumination source, an improvement comprising: a rotor inside said concaved housing of said bushing, said rotor comprising a recess in its center and a front end and a rear end, said bushing comprising a front portion and an end portion, said illumination source being in the back of said recess of said rotor, said rotational operation shaft including a front end and a rear end, said rotational operation shaft rotatably connected to said bushing so as to freely rotate, and said rear end of said rotational operation shaft connected to said front end of said rotor by a releasable connection means, so as to rotate with said rotor, said rotational operation shaft connected to said rotor by inserting said rotational operation shaft through said front portion and then through said end portion of said bushing;

said rotational operation shaft including an elevated step portion contacting said front portion of said bushing, wherein in assembly said rotational operation shaft is inserted into said front portion of said bushing and is connected by said releasable connection means to said rotor, thereby putting the elevated step portion into contact with said front portion of said bushing.

2. The electronic illumination apparatus of claim 1 wherein the rotor is made of a transparent resin, a light collecting convex lens is formed integrally therewith in front of the recess at the center of said rotor.

3. The electronic illumination apparatus of claim 2 wherein the light collecting convex lens of the transparent resin-made rotor and the illumination source are located toward inside of the rear end of a feed through hole of the rotational operation shaft and also said feed-through hole is gradually changing its diameter from a larger diameter section in its rear end to a smaller diameter section in its front end.

4. An electronic illumination apparatus comprising:

a substrate having thereon a resistor in contact with a brush, said brush positioned on a brush holder, wherein by rotating said brush holder the brush moves over said resistor thereby providing a variable resistance for a current passing through said resistor;

a driver connected to said brush holder;

a rotor connected to said driver and having thereon a stopper, said rotor further having positioned therein an illumination source, said rotor having a recess in its center, said rotor comprising a front end and a rear end;

a bushing, with a concaved housing, connected to said rotor, said bushing comprising a front portion and an end portion and a projection which rotationally contacts said stopper of said rotor, said rotor disposed inside said concaved housing of said bushing and said illumination source disposed in the back of said recess of said rotor; and a rotational operation shaft comprising a front end and a rear end, said rotational operation shaft rotatably connected to said bushing so as to freely rotate, and said rear end of said rotational operation shaft connected to said front end of said rotor by a releasable connection means so as to rotate with said rotor, said rotational operation shaft having therethrough a feed-through hole through which the light of said illumination source is directed, said rotation of said rotational operation shaft being partially restricted by said stopper contacting said projection, said rotational operation shaft connected to said rotor by inserting said rotational operation shaft through said front portion and then through said end portion of said bushing, said rotational operation shaft including an elevated step portion contacting said front portion of said bushing, wherein in assembly said rotational operation shaft is inserted into said front portion of said bushing and is connected by said releasable connection means to said rotor, thereby putting the elevated step portion into contact with said front portion of said bushing and, wherein rotation of said driver in turn causes the rotation of said rotor and said rotational operation shaft.

5. The electronic illumination apparatus of claim 4, wherein said rotor further comprises a lens which focuses said illumination source through said feed-through hole.

6. The electronic illumination apparatus of claim 5, wherein said feed-through hole is tapered gradually so that the diameter of said feed-through hole proximate to said rotor is greater than the diameter of the feed through hole furthest from said rotor.

7. The electronic illumination apparatus of claim 4 wherein said rotor is made of a resin.

8. The electronic illumination apparatus of claim 7 wherein a lens, included in said rotor, and said rotor are integrally made of a resin.

9. An electronic illumination apparatus comprising:

a substrate having thereon a resistor in contact with a brush, said brush positioned on a brush holder, wherein by rotating said brush holder the brush moves over said resistor thereby providing a variable resistance for a current passing through said resistor;

a driver connected to said brush holder;

a rotor connected to said driver and having thereon a stopper, said rotor further having positioned therein an illumination source, said rotor having a recess in its center, said rotor comprising a front end and a rear end;

a bushing, with a concaved housing, connected to said rotor, said bushing comprising a front portion and an end portion and a projection which rotationally contacts said stopper of said rotor, said rotor disposed inside said concaved housing of said bushing and said illumination source disposed in the back of said recess of said rotor; and a rotational operation shaft comprising a front end and a rear end, said rotational operation shaft rotatably connected to said bushing so as to freely rotate, and and said rear end of said rotational operation shaft connected to said front end of said rotor by a releasable connection means so as to rotate with said rotor, said rotational operation shaft having therethrough a feed-through hole through which the light of said illumination source is directed, wherein said rotation of said rotational operation shaft is partially restricted by said stopper contacting said projection, said rotational operation shaft connected to said rotor by inserting said rotational operation shaft through said front portion and then through said end portion of said bushing;

said rotational operation shaft including an elevated step portion contacting said front portion of said bushing, wherein in assembly said rotational operation shaft is inserted into said front portion of said bushing and is connected by said releasable connection means to said rotor, thereby putting the elevated step portion into contact with said front portion of said bushing and, a speed reduction gear mechanism connected to said driver; and a motor capable of applying power to said speed reduction gear mechanism, wherein the operation of said motor results in the operation of said speed reduction gear mechanism which rotates a shaft of said driver thereby concurrently rotating said rotor and said rotational operation shaft, the rotation of said driver also rotating said brush against said resistor substrate thereby providing a variable resistance, said rotation being impeded by the impact of said stopper against said projection on said bushing.

10. The electronic illumination apparatus of claim 9, wherein said rotor further comprises a lens which focuses said illumination source through said feed-through hole.

11. The electronic illumination apparatus of claim 9, wherein said feed-through hole is tapered gradually so that the diameter of said feed-through hole proximate to said rotor is greater than the diameter of the feed through hole furthest from said rotor.

12. The electronic illumination apparatus of claim 9 wherein said rotor is made of a resin.

13. The electronic illumination apparatus of claim 12 wherein a lens, included in said rotor, and said rotor are integrally made of a resin.

14. The electronic illumination apparatus of claim 9 wherein said illumination source transmits light to an indicator knob on the frontward end of said rotational operation shaft.

* * * * *